Patented July 12, 1932

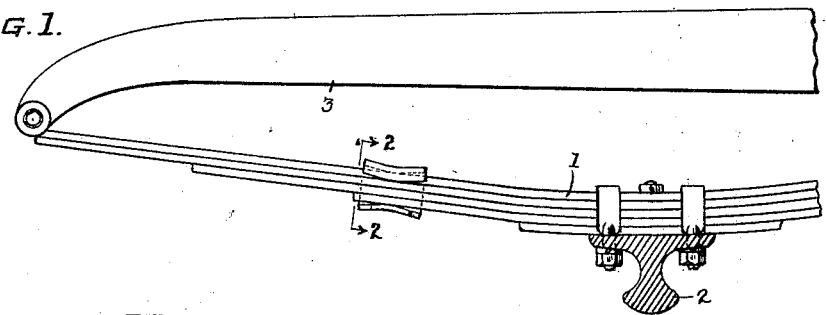
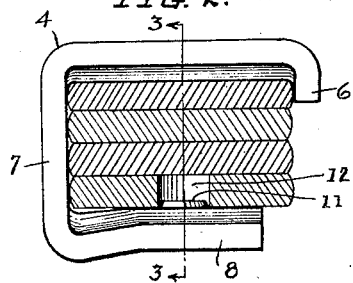
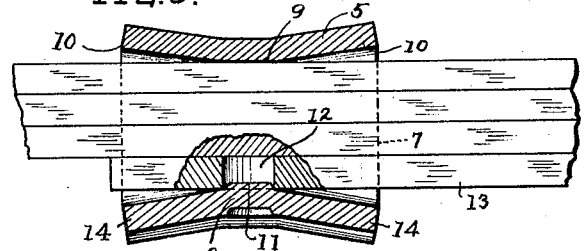
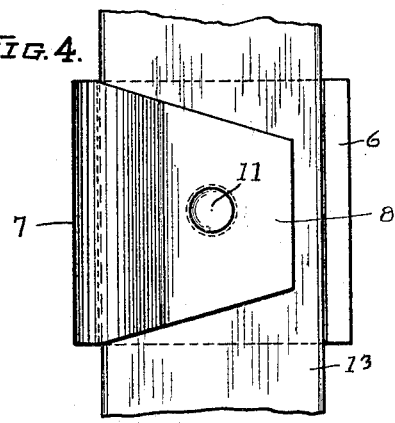
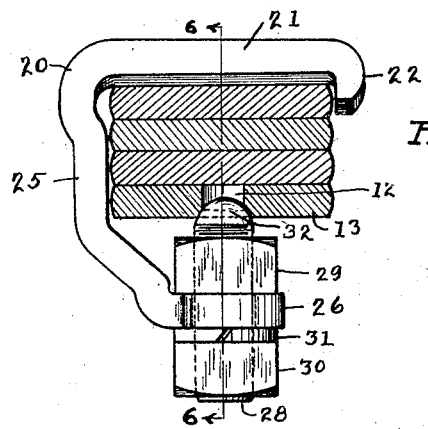
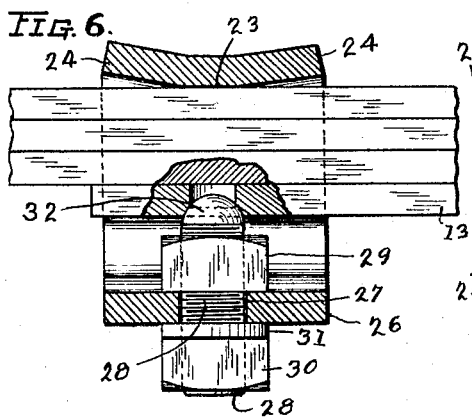
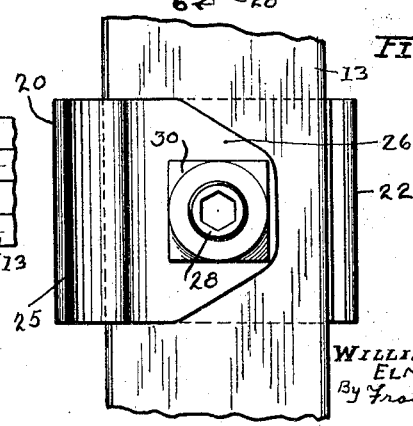

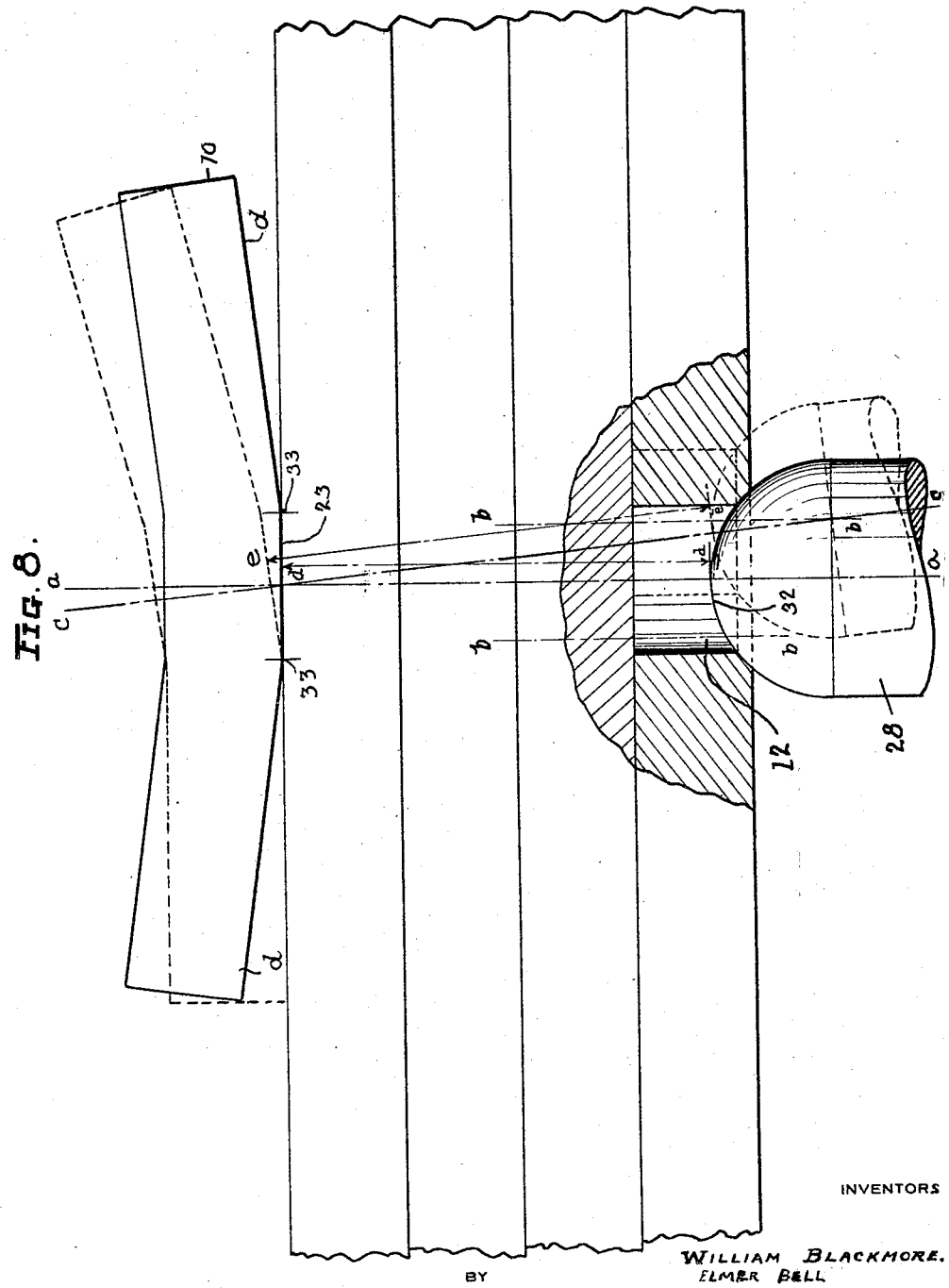

1,867,203

UNITED STATES PATENT OFFICE

WILLIAM BLACKMORE AND ELMER BELL, OF SHARON, PENNSYLVANIA, ASSIGNORS OF ONE-THIRD TO WILLIAM C. BLACKMORE, OF CLEVELAND, OHIO

COMBINED SPRING CLIP AND SNUBBER

Application filed April 7, 1930. Serial No. 442,082.

The present invention relates to a combined spring clip and shock absorber for the springs of motor vehicles.

In the manufacture of automobile springs, it is the usual practice to build the springs with a flexibility such as to provide easy riding qualities on reasonably smooth roads and pavements.

When a vehicle spring is provided with the flexibility necessary for easy riding on reasonably smooth roads, the springs will have an excessive rebound when the automobile is driven over rough roads, which results in considerable discomfort of passengers. To overcome this difficulty, the use of shock absorbing devices has become quite general. The shock absorbing devices in most general use are quite expensive, costing several times as much as the vehicle springs to which they are attached.

The present invention has for its object to provide a clip for motor vehicle springs which is adapted to replace the usual clip employed for holding the leaves of the spring against relative lateral movements, and which also serves as an efficient snubber or shock absorber, whereby the desired easy riding qualities both on smooth and rough roads may be built into the spring with little, if any, increase in the cost of manufacture of the springs.

In Patent No. 1,628,386, granted May 10, 1927, there is disclosed a shock absorber which utilizes interleaf friction to absorb shocks and restrain excessive flexing of the springs. This shock absorber consists of a resilient steel clip attached to the spring which is provided with a cam and actuating lever for applying a gradually increasing pressure to the leaves of the spring during flexing movements thereof. In this patent, there is also disclosed a modification in which a resilient steel clip is provided with means for maintaining the constant pressure on the leaves of the spring to increase the interleaf friction and prevent excessive flexing of the spring. The latter device is effective on rough roads, but increases the stiffness of the springs to an extent such that they do not have the smooth action desirable for absorbing slight shocks such as occur in driving on boulevards.

The device of the present invention is an improvement on the invention disclosed in the patent, providing a shock absorber in the form of a resilient steel clip which may serve the purpose of the usual spring clip and which also acts as a shock absorber being designed to apply a uniformly increasing pressure to the leaves of the spring during flexing movements thereof, no mechanically actuated pressure applying device such as shown in the patent being required.

A further object of the invention is to provide a shock absorbing device in the form of a resilient steel clip which engages the spring in such manner that it is positively held against creeping movement on the spring.

A further object of the invention is to provide a combined spring clip and shock absorber which is inexpensive to manufacture and which can be quickly and easily applied to the portion of the spring to which the leaf retaining clip is ordinarily applied.

With the above and other objects in view, the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Figure 1 is a fragmentary side elevation showing a vehicle spring with the device of the present invention applied thereto.

Fig. 2 is a section taken on the line indicated at 2—2 in Fig. 1.

Fig. 3 is a section taken on the line indicated at 3—3 in Fig. 2.

Fig. 4 is a bottom plan view of the clip applied to a spring.

Fig. 5 is a sectional view showing the slightly modified form of the invention.

Fig. 6 is a section taken on the line indicated at 6—6 in Fig. 5.

Fig. 7 is a bottom plan view of the clip shown in Fig. 5.

Fig. 8 is a diagrammatic view on an enlarged scale illustrating the operation of the device.

In Fig. 1 of the drawings, the combined spring clip and shock absorber of the present invention is shown applied to an automobile spring 1, which is attached at its center to an axle 2 and at its rear end to a side rail 3 of the automobile frame.

The device of the present invention is a U-shaped clip 4 formed of spring steel and adapted to be secured upon an automobile spring. The U-shaped clip 4 has a top arm 5 which is adapted to extend across the top leaf of the spring, the arm 5 being provided at its outer end with a short downturned flange 6. The clip 4 has a base portion 7, which connects the top arm 5 of the clip with a bottom arm 8 which underlies the bottom leaf of the spring. The top arm 5 of the clip has a narrow central bearing portion 5 which is flat and engages the top face of the top leaf of the spring, the side portions 10 of the top arm being inclined upwardly away from the central bearing portion 9 so that the arm 5 has a relatively narrow bearing across the top face of the spring.

The bottom arm 8 is provided with an integral bearing projection or dowel 11 which may be pressed up from the body of the metal and which is adapted to engage in a central hole 12 in the bottom leaf 13 of the spring which may be a rivet hole such as provided for the usual spring clip, side portions 14 of the bottom arm 8 being inclined downwardly from the central dowel 11, so that the arm 8 is free to rock laterally on the central bearing projection 11.

The resilient steel clip 4 is so constructed that when placed on the spring, the arms 5 and 8 are spread apart a predetermined amount and a predetermined spring pressure is applied to the leaves of the spring by the clip. As will hereinafter be more fully explained, a flexing movement of the spring will cause the lower leaves of the spring to slide with respect to the leaves above them, causing the clip to rock upon one edge or the other of its upper bearing portion 9, thereby spreading the arms 5 and 8 farther apart and applying a gradually increasing pressure to the leaves of the spring, causing the interleaf friction to be gradually increased, and thereby imposing an increasing resistance to flexing movement and limiting the extent of flexing movement in both directions and quickly stopping the oscillating movements of the spring.

The clip shown in Figs. 1 to 4 can be applied to the spring by slipping the clip sidewise onto the spring beyond the end of the leaf 13, which is to be engaged by the bottom arm 8 and then driving the clip with a hammer over the end of the leaf 13 until the dowell 11 snaps into the rivet hole 12. The flaring side portions 10 and 14 of the arms 5 and 8 serve to guide the clip up over the end of the leaf 13 so that the clip may be readily driven into place.

Figs. 5 to 7 of the drawings show a modified form of the invention in which a U-shaped resilient steel clip 20 is provided with a top arm 21 and short flange 22 substantially identical with the top arm 5 and flange 6 of the clip above described, the arm 21 having a narrow central bearing portion 23 and inclined side portions 24 on opposite sides of the central bearing portion. The clip 20 has a base portion 25 connecting the top arm 21 with the bottom arm 26 which extends underneath the bottom of the spring 1. In this modification, the bottom arm 26 is spaced below the bottom of the spring 1 and is provided with an aperture 27 which is centrally disposed with respect to the bearing portion 23 and adapted to lie beneath the center line of the spring 1. The aperture 27 receives an adjustable pin 28 which is externally threaded and is held in adjusted position in the arm 26 by means of nuts 29 and 30 threaded on the pin, one above and the other below the arm 26, a spring washer 31 being interposed between the lower nut 30 and the bottom of the arm 26. The nuts 29 and 30 and washer 31 serve to positively lock the bearing pin 28 in adjusted position in the arm 26 and the upper end of the pin 28 is provided with a round end 32 which is adapted to engage in the rivet hole 12 of the bottom leaf 13 of the spring. By adjusting the bearing pin 28, the arms 21 and 26 of the resilient clip may be forced outwardly from their normal position sufficiently to cause them to impose the desired initial pressure on the leaves of the spring.

The shock absorbing action of the clip is illustrated in Fig. 8 of the drawings in which a line $a$—$a$ indicates the normal line of pressure between the arms of the clip. Flexing of the spring causes the leaves of the spring to have longitudinal sliding movement one upon the other, line $b$—$b$ indicating a shifted position of the center line of the hole 12. This shifting of the leaf 13 causes the bearing pin 28 to be shifted with the hole 12 in which it bears and this lateral movement of the lower arm of the clip causes the upper arm 21 to rock about an edge 33 of its central bearing portion 23 as a fulcrum, shifting the center line of the clip from the vertical position $a$—$a$ to an inclined position indicated by the line $c$—$c$. The rocking of the clip about the fulcrum 33 causes a spreading of the resilient arms of the clip which is indicated by the difference in the length of lines $d$—$d$ and $e$—$e$.

It will thus be apparent that a flexing movement of the spring in either direction from a neutral position 1 causes a gradually increasing pressure to be exerted by the spring clip on the leaves of the spring which results in a gradually increasing resistance to flexing movement. It will be noted that the pin 28 has a rocking movement in the aperture 12, causing the axis thereof to be shifted away from the center of the hole when the clip is tilted so that the actual lateral movement of the pin is less than the sliding movement of the leaf 13. The provision of a narrow central bearing for the top arm of the clip causes the pressure immediately after a flexing movement of the spring is started to be exerted along the fulcrum line 33 so that the high pressure exerted on a very limited area along this line offers great resistance to sliding movement of the upper arm of the clip on the top leaf of the spring and effectually prevents any relatively sliding movement between the spring and clip and, since the bottom arm of the clip is anchored by means of the bearing pin or dowel in the hole 12, the arms of the clip will be moved apart and the pressure exerted by the arms will be increased proportionally to the relative sliding movement of the leaves of the spring.

A clip constructed in accordance with the present invention may be set to apply the desired pressure to the springs in the normal position, and, upon deflection of the spring, there will be a substantially uniform increase in pressure during the flexing movement of the springs.

In testing the shock absorbing clips of the present invention, it has been found that the increase in pressure is very nearly uniform and proportional to the amount of slip between the leaves of the spring. In one instance, it was found that, with the clip set to exert an initial pressure of approximately 200 lbs., an additional pressure of 20 lbs. was applied for each .001 inch the spaced arms of clip were moved apart. With a deflection between the spaced arms of .025, the increased load equaled 500 lbs., which, plus the 200 initial pressure brought the total clamping pressure up to 700 lbs., which is sufficient to very effectively control the spring recoil.

It is generally conceded to be desirable that a shock absorber should have a variable action and absorb the most energy near the point of maximum travel and should absorb the least energy at approximately mid-travel, i. e., the position which the springs normally occupy under the superposed load. The clip of the present invention meets these conditions very effectively, rocking in one direction above the mid-point and in the opposite direction below the mid-point so that on both the initial impact and on the recoil, the flexing movement of the spring is effectively checked.

The device of the present invention serves every purpose of the retaining clip ordinarily employed. It comprises fewer parts than the clip ordinarily used and can be manufactured at a cost but little, if any, higher than the cost of the usual spring clip, which performs only the function of holding the leaves of the spring against relative lateral movements.

The present invention thus provides a means of building into the spring itself the shock absorbing qualities heretofore lacking and makes unnecessary the use of expensive shock absorbing devices on automobile springs.

Furthermore, it is to be understood that the particular form of apparatus shown and described, and the particular procedure set forth, are presented for purposes of explanation and illustration and that various modifications of said apparatus and procedure can be made without departing from our invention as defined in the appended claims.

What we claim is:

1. The combination with a spring composed of superposed leaves, of a shock absorber comprising a resilient steel clip having spaced arms adapted to receive a plurality of superposed leaves of the spring between them and to clamp said leaves with spring pressure, one of said arms having a flat bearing portion of less width than the arm, said bearing portion of the arm extending longitudinally and engaging the leaf on one face of the spring, the other arm having a bearing projection opposite said flat bearing portion and centrally disposed with respect thereto, said projection having rocking engagement with the leaf on the face of the spring opposite that engaged by the flat bearing portion.

2. The combination with a spring composed of superposed leaves, of a shock absorber comprising a resilient steel clip having spaced arms adapted to receive a plurality of superposed leaves of the spring between them and to clamp said leaves with spring pressure, one of said arms having a flat bearing portion on its inner face of less width than the arm, said bearing portion extending longitudinally of the arm, said arm having side portions inclined outwardly with respect to the bearing portion to provide angular bearing edges along opposite sides of said bearing portion, the other of said arms having a bearing projection opposite said flat bearing portion and centrally disposed with respect thereto, said flat bearing portion and bearing projection engaging the leaves on opposite faces of the spring, and providing rocking engagement between said arms and leaves.

3. The combination with a spring composed of superposed leaves and having a leaf on one face thereof provided with a recess, of a shock absorber comprising a resilient steel clip having spaced arms adapted to receive a plurality of superposed leaves of the spring between them and to clamp said leaves with spring pressure, one of said arms having a bearing projection in rocking engagement with the spring in said recess, the other of said arms having a flat bearing portion of less width than the arm engageable across the face of the spring opposite said recess, said narrow bearing portion providing fulcrums at its opposite edges about which said clip rocks upon relative longitudinal sliding movements of the leaves of the spring.

4. The combination with a spring composed of superposed leaves and having a leaf on one face thereof provided with a recess of a shock absorber comprising a resilient steel clip having spaced arms adapted to receive a plurality of superposed leaves of the spring between them and to clamp said leaves with spring pressure, one of said arms having a bearing projection in rocking engagement with the spring in said recess, the other of said arms having a flat bearing portion of less width than the arm extending longitudinally thereof and engaging the spring across the face thereof opposite said recess, said arm having side portions inclined outwardly with respect to said bearing portion and providing fulcrums at the edges of said bearing portion on opposite sides of the center plane of the clip about which the clip is rocked upon relative longitudinal sliding movements of the leaves of the spring.

5. A combined spring clip and shock absorber for leaf springs comprising a resilient steel clip of U-shape have spaced arms adapted to receive a plurality of the superposed leaves of the spring between them and to clamp said leaves with spring pressure to increase the friction between said leaves, said clip having a base portion connecting said arms and engageable with one side of the spring and one of said arms having a flange engageable with the opposite side of the spring to hold the leaves of the spring against relative lateral movements.

6. A combined spring clip and shock absorber for leaf springs comprising a resilient steel clip of U-shape having spaced arms adapted to receive a plurality of the superposed leaves of the spring between them and to clamp said leaves with spring pressure to increase the friction between said leaves, the upper of said arms having a depending flange at its outer end engageable with one side of the spring, said clip having a base portion connecting said arms and engageable with the opposite side of the spring, whereby the leaves of the spring are held against relative lateral movements by said flange and base portion.

7. A combined spring clip and shock absorber for leaf springs comprising a resilient steel clip of U-shape having spaced arms adapted to receive a plurality of the superposed leaves of the spring between them and to clamp said leaves with spring pressure to increase the friction between said leaves, said clip having a base portion connecting said arms and engageable with one side of the spring and one of said arms having a flange engageable with the opposite side of the spring to hold the leaves of the spring against relative lateral movements, said arms being provided with bearing portions having non-slipping engagement with the top and bottom leaves whereby said arms are sprung apart by relative sliding movements of the leaves to increase the spring pressure exerted by the clip on the leaves.

8. A combined spring clip and shock absorber for leaf springs comprising a resilient steel clip of U-shape having spaced arms adapted to receive a plurality of the superposed leaves of the spring between them and to clamp said leaves with spring pressure to increase the friction between said leaves, said clip having a base portion connecting said arms and engageable with one side of the spring and one of said arms having a flange engageable with the opposite side of the spring to hold the leaves of the spring against relative lateral movements, one of said arms having a narrow flat bearing portion extending longitudinally thereof and engageable with the face of the adjacent leaf of the spring, the other of said arms having a bearing projection centrally disposed with respect to said flat bearing portion and engageable with the opposite leaf of the spring.

In testimony whereof we affix our signatures.

WILLIAM BLACKMORE.
ELMER BELL.